United States Patent [19]

Takeuchi et al.

[11] Patent Number: 4,626,758
[45] Date of Patent: Dec. 2, 1986

[54] DIGITAL VALVE CONTROL APPARATUS

[75] Inventors: Kunihiko Takeuchi, Kanagawa; Fujio Baba, Tokyo; Kiyoshi Hayashi, Tokyo; Yasuo Shimomura, Tokyo; Yuji Morishige, Chiba, all of Japan

[73] Assignee: Tokyo Keiki Company, Ltd., Tokyo, Japan

[21] Appl. No.: 820,928

[22] Filed: Jan. 22, 1986

Related U.S. Application Data

[63] Continuation-in-part of Ser. No. 667,371, Nov. 1, 1984, abandoned.

[30] Foreign Application Priority Data

Nov. 4, 1983 [JP] Japan .............................. 58-207207

[51] Int. Cl.⁴ ............................................. G05B 19/28
[52] U.S. Cl. .................................... 318/603; 318/685; 318/696
[58] Field of Search ......................... 318/603, 685, 696

[56] References Cited

U.S. PATENT DOCUMENTS

| 4,066,941 | 1/1978 | Foster | 318/341 |
| 4,169,991 | 10/1979 | Ross | 318/603 X |
| 4,445,075 | 4/1984 | Fry | 318/603 X |
| 4,470,108 | 9/1984 | Kato et al. | 318/603 X |
| 4,528,491 | 7/1985 | Takeuchi et al. | 318/603 |
| 4,529,922 | 7/1985 | Ono | 318/603 |

Primary Examiner—B. Dobeck
Attorney, Agent, or Firm—Wenderoth, Lind & Ponack

[57] ABSTRACT

A digital valve control apparatus for regulating opening of a digital valve by a pulse motor, comprising means for setting desired position and displacement speed of the pulse motor and means for selecting the set position and the set speed in response to instruction signals. While pulses having period corresponding to the set speed are produced by a frequency divider, the present position of the pulse motor is compared with the set position by a comparator. The pulses are fed to a counter which counts up or down to supply the output for driving the pulse motor until the comparator produces the coincident output.

3 Claims, 3 Drawing Figures

DIGITAL VALVE CONTROL APPARATUS

This application is a contination-in-part of now abandoned application Ser. No. 667,371, filed Nov. 1, 1984.

BACKGROUND OF THE INVENTION

The present invention relates to a digital valve control apparatus for controlling a digital valve whose opening is regulated by a pulse motor.

The inventors have already proposed a digital valve control apparatus for controlling a pulse motor of a digital valve so that a prescribed flow rate can be obtained in accordance with table data for determining the opening of the digital valve and table data for determining a displacement pattern until the valve attains the controlled opening (see Japanese Patent Application Ser. Nos. 29,052/1983 and 100,506/1983).

However, a control apparatus which uses table data has the advantage that optional control characteristics can be freely produced, but requires a memory for storing the table data. The required capacity of the memory should be so large that the constitution of the circuit becomes complex because, for example, two hundred and fifty six types of table data are needed if a maximum number of pulse motor steps is 256. As a result, the apparatus becomes large in scale. In addition, a specific loader is necessary for writing the table data into the memory. Therefore, an apparatus which can freely determine the control characteristics to a certain extent with a simple constitution is desired.

SUMMARY OF THE INVENTION

An object of the present invention is to provide a digital valve control apparatus which permits a desired control characteristic of digital valve to be set without using table data and has a simple circuit constitution.

Another object of the present invention is to provide a digital valve control apparatus which permits the control pattern to be easily changed.

Still another object of the present invention is to provide a digital valve control apparatus which can realize the most suitable control characteristic for the hydraulic equipment using the digital valve at small size and low cost.

These and other objects, features and advantages of the invention will become apparent from the following description taken in connection with the accompanying drawings.

DESCRIPTION OF THE PREFERRED EMBODIMENT

Figure 1:
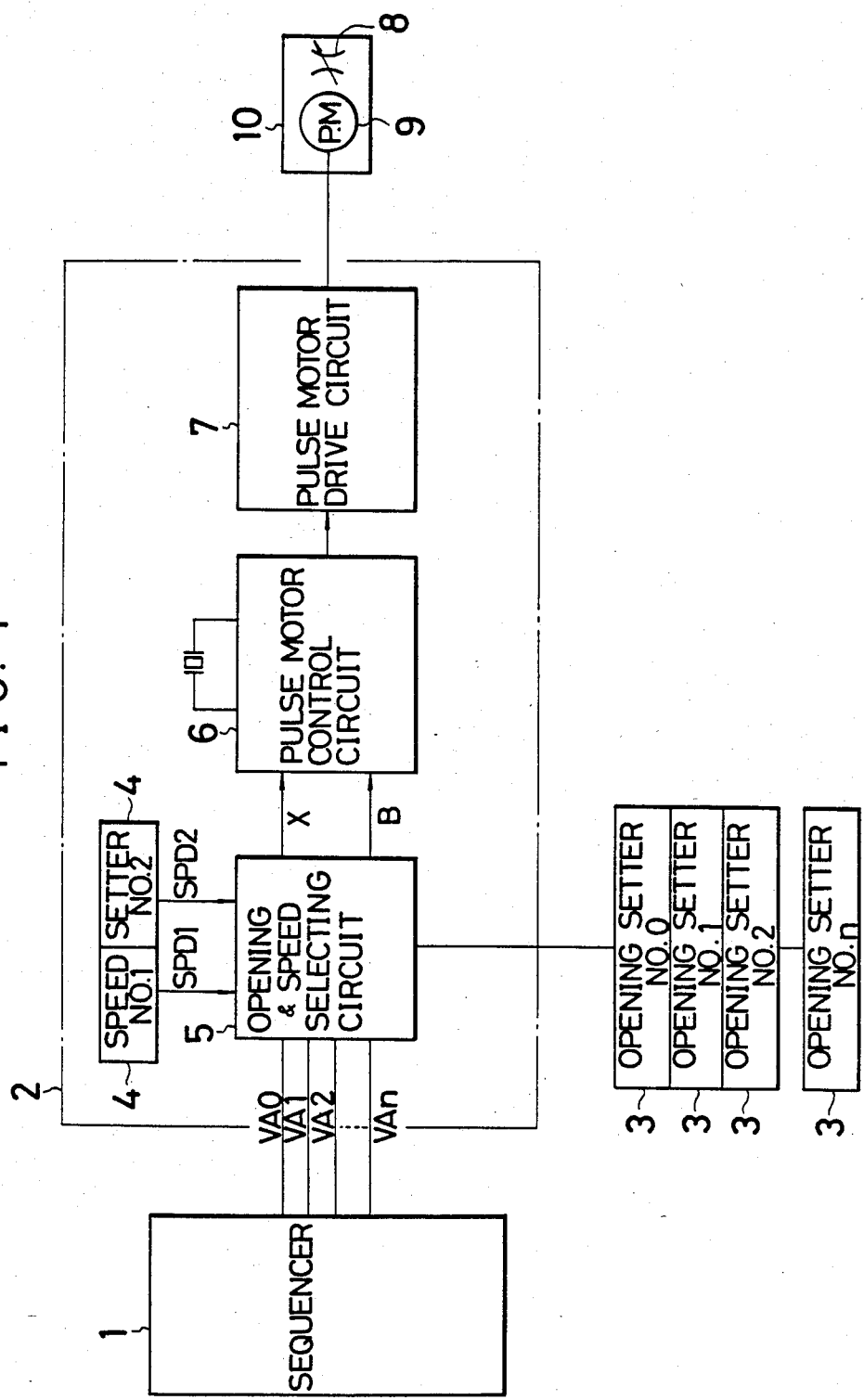
FIG. 1 is a block diagram showing one embodiment of the present invention.

FIG. 1 is a block diagram showing one embodiment of the digital valve control apparatus according to the present invention. The apparatus comprises a sequencer 1 as an external device, which outputs instruction signals VA0 to VAn for controlling a digital valve in accordance with a predetermined sequence. The sequencer 1 is one of the "MELSEC Series" manufactured by the Mitsubishi Electric Co., Ltd. of Japan. Otherwise, a product manufactured by the Allen & Bradley Corporation can be used. Instead of the sequence 1, starting switches may be used for producing the instruction signals VA0 to VAn by manual operations.

The apparatus also comprises a pulse motor control unit 2 which has a plurality of opening setters 3 labeled NO.1 to NO.n for setting the opening of a digital valve 10, i.e., the position of a pulse motor 9 provided at the digital valve 10 as the absolute position and a plurality of speed setters 4 labeled NO.1 and NO.2 for setting the displacement speed of the pulse motor 9. The outputs of the opening setter 3 and the speed setter 4 are supplied to a selecting circuit 5 which receives the instruction signals VA0 to VAn from the sequencer 1. The selecting circuit 5 selects one of the set openings NO.1 to NO.n from the opening setters 3 corresponding to one of the instruction signals VA0 to VAn from the sequencer 1 and outputs a selected opening signal B. Also, the selecting circuit 5 selects the set speed from the speed setter 4 labeled NO.1 or NO.2 and outputs the speed signal x (ms/step). The opening signal B and the speed signal x selected by the selecting circuit 5 are input to a pulse motor control circuit 6 which produces necessary number of pulses for obtaining the set opening B at the selected speed (period) x. The pulses from the pulse motor control circuit 6 are fed to a pulse motor drive circuit 7 which rotatively drives the pulse motor 9 provided at the digital valve 10 in an open or closed direction so as to regulate a variable restrictor 8 to the set opening.

Figure 2:
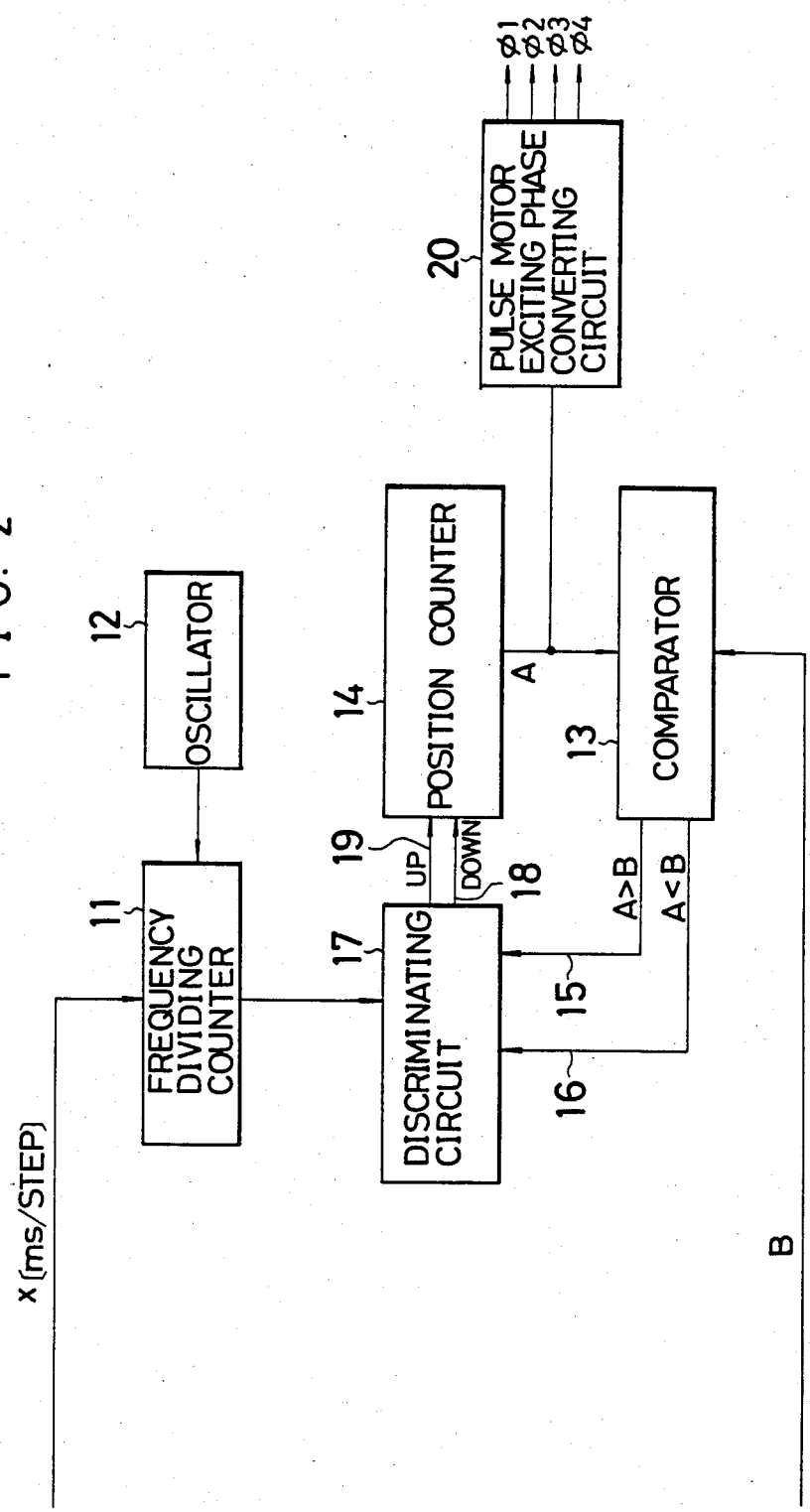
FIG. 2 is a block diagram showing one example of the pulse motor control unit.

FIG. 2 is a block diagram showing one example of the pulse motor control circuit 6 of FIG. 1.

As shown in FIG. 2, the speed signal x is input to a frequency dividing counter 11 which is set at the ratio of frequency division for producing pulses having a period corresponding to the speed signal x. The counter 11 divides the frequency of clock pulses from an oscillator 12 by the ratio of frequency division corresponding to the speed signal x and outputs the frequency divided pulses.

The position signal B corresponding to the set opening from the selecting circuit 5 is input to a comparator 13. Also, a present position signal A from a position counter 14 using an up-down counter is input to the comparator 13. The comparator 13 determines the difference between the set position B and the present position A, and produces an output 15 when the present position A is larger than the set position B, i.e., A>B or an output 16 when the present position A is smaller than the set position B, i.e., A<B. The outputs 15 and 16 are input to a discrimating circuit 17 which determines the counting up or the counting down of the position counter 14 in response to the output 15 or 16. That is, when the discriminating circuit 17 receives the output 15 from the comparator 13 in the case of A>B, the discriminating circuit 17 supplies down pulses 18 consisting of the frequency divided pulses from the frequency dividing counter 11 to the position counter 14. When the discriminating circuit 17 receives the output 16 from the comparator 13 in the case of A<B, the discriminating circuit 17 supplies up pulses 19 consisting of the frequency divided pulses from the frequency dividing counter 11 to the position counter 14. Furthermore, when neither of the outputs 15 and 16 are fed to the discriminating circuit 17, i.e., the present position A is equal to the set position B (A=B), the discriminating circuit 17 stops supplying the frequency dividing pulses to the position counter 14. The output obtained by the up or down counting in the position counter 14 is fed to a pulse motor exciting phase converting circuit 20, and is converted to the exciting phases required for driving the pulse motor, for example, four phase pulses $\phi 1$ to $\phi 4$, and supplied to the pulse motor drive circuit 7.

Figure 3:
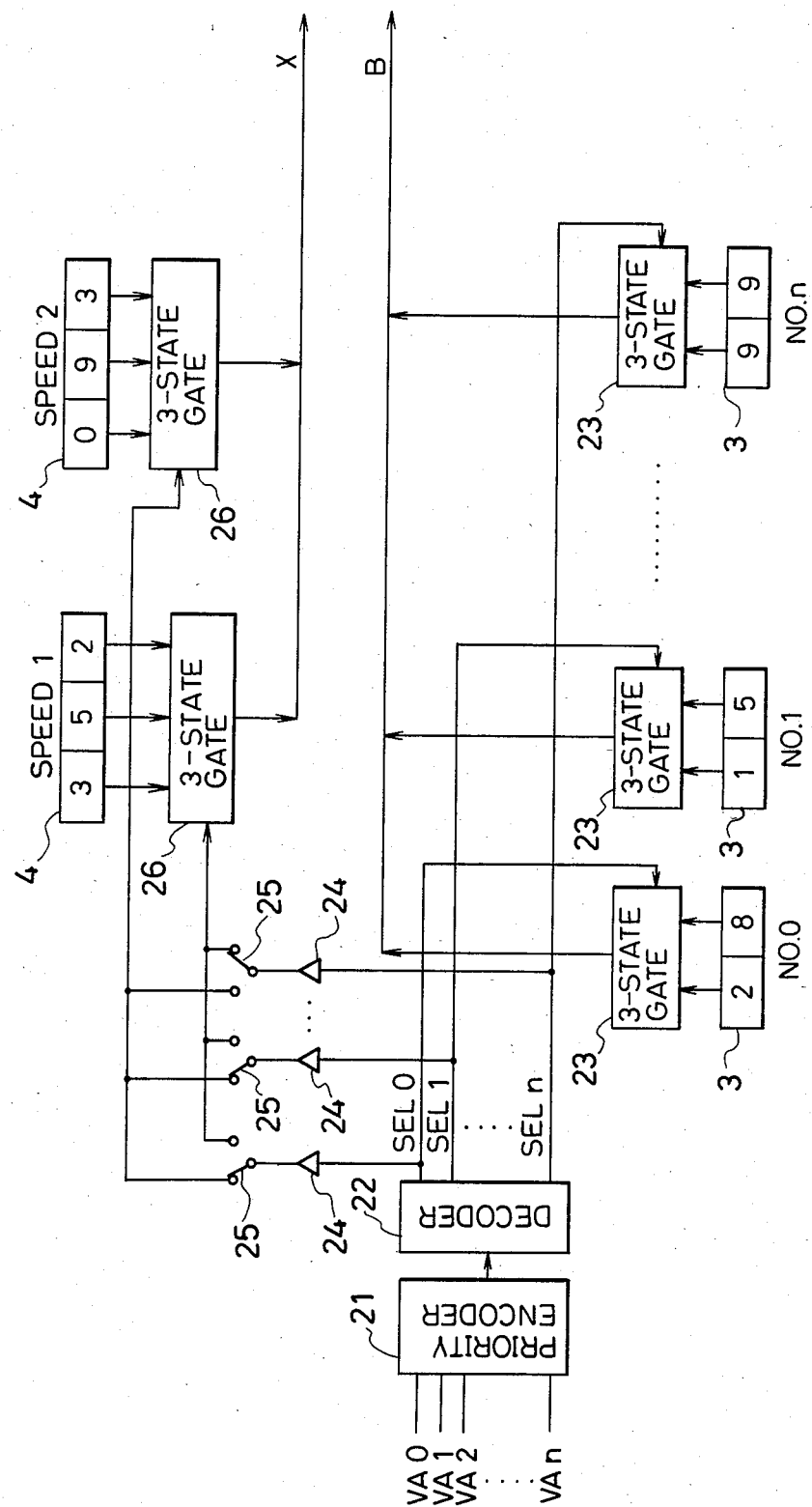
FIG. 3 is a block diagram showing one example of the selecting circuit of FIG. 1.

FIG. 3 shows an example of the selecting circuit 5 in the embodiment of FIG. 1.

In FIG. 3, the instruction signals VA0 to VAn for selecting the pressure or the flow rate, which are supplied from the sequencer 1 are inputted to a priority encoder 21 and thereby converted into binary numbers, and then decoded by a decoder 22 so as to respectively output corresponding selecting signals SEL0 to SELn.

If more than two instruction signals are inputted to the encoder 21 at the same time (the instruction signal generating means, such as the sequencer 1, is constructed so as to prevent that, but in fact there is the case that a delay in the program or an electrical delay causes such simultaneous inputs when the instruction signal is changed, e.g. VA5 is changed to VA0), then the signal which has higher priority than the other signals (e.g. the less the number n is, the higher its priority) is converted into a binary number, and correspondingly, only one of the (n+1) outputs SEL0 to SELn from the decoder 22 becomes "true". For example, if the signals VA5, VA2 and VA0 are inputted at the same time, only VA0 is selected by the encoder 21 and hence only SEL0 is outputted from the decoder 22.

The selecting signal (one of the signals SEL0 to SELn) determined singularly, as mentioned above, is supplied as an output enable signal to a tristate gate 23 which selectively outputs the value set by the corresponding one of the opening setters 3 of No. 0 to No. n. The tristate gate 23 is normally in a state of output inhibition, but when the output enable signal is supplied, the gate 23 outputs the value set by the corresponding opening setter 3 (e.g. "28" of No. 0) as the set opening B for the following pulse motor control circuit 6.

As for the opening setter 3, a thumb wheel digital switch manufactured by the Izumi Electric Co., Ltd. of Japan can be used.

Each of the selecting signal outputs SEL0 to SELn from the decoder 22 is also supplied as an output enable signal to a tristate gate 26 which selectively outputs the data set by the corresponding one of the speed setters 4 of No. 1 and No. 2 through a wired OR gate 24 and a speed mode preset switch 25, respectively. The tristate gate 26 is normally in a state of output inhibition, but when the output enable signal is supplied, the gate 26 outputs the value set by the corresponding speed setter 4 (e.g. "352" of No. 1) as the set speed x for the pulse motor control circuit 6.

As for the speed setter 4, a thumb wheel digital switch manufactured by the Copal Corporation of Japan can be used.

In the embodiment as shown in FIG. 1–3, since two speed setters 4 of No. 1 and No. 2 are provided, it is predetermined whether the "SPEED 1" set by the speed setter 4 of No. 1 or the "SPEED 2" set by the speed setter 4 of No. 2 is selected for each of the instruction signals VA0 to VAn. In FIG. 3, the switch 25 is preset such that, for example, "093" (9.3 ms/step) of SPEED 2 is selected if the selecting signal SEL0 or SEL1 corresponding to the instruction signals VA0 or VA1 is true.

If cost permits, however, it is possible to provide the same number of speed setters 4 as the instruction signals VA0 to VAn, and in this case, the preset operation by the switch 25, as mentioned above, is not required.

Next, the operation of the embodiment of FIGS. 1 and 2 is explained.

Preliminarily, corresponding to the instruction signals VA0 to VAn from the sequencer 1, a desired opening is set by each of the opening setters 3 labeled NO.1 to No.n and also a desired speed is set by the speed setter 4 labeled NO.1 or NO.2.

When the sequencer 1 is initiated in this state, the instruction signals VA0 to VAn are sequentially fed to the pulse motor control unit 2 in accordance with the predetermined control procedure. On receiving each of the instruction signals from the sequencer 1, the selecting circuit 5 selects the opening set by the opening setter 3 corresponding to that instruction signal and outputs it as the opening signal B. At the same time, the selecting circuit 5 selects the speed set by the speed setter 4 labeled NO.1 or NO.2 and outputs it as the speed signal x to the pulse motor control circuit 6.

In the pulse motor control circuit 6, as shown in FIG. 2, the opening signal is input to the comparator 13 as the set position signal B and the speed signal x is input to the frequency dividing counter 11. The frequency dividing counter 11 is set at the ratio of frequency division to define the period corresponding to the speed signal x, and divide the frequency of the clock pulses from the oscillator 12 to produce the frequency divided pulses having the period corresponding to the set speed.

The comparator 13 compares the set position B and the present position A of the pulse motor which has been counted by the position counter 14. If A>B, the comparator 13 produces the output 15 and the discriminating circuit 17 supplies the frequency divided pulses of the frequency dividing counter 11 as the down pulses 18 to the position counter 14, in which the count of the present position A is subtracted with a period determined by the set speed. The down output of the position counter 14 is converted to the drive pulses $\phi 1$ to $\phi 4$ by the pulse motor exciting phase converting circuit 20 to rotate the pulse motor 9 in the direction such that the variable restrictor 8 of the digital valve 10 is closed.

Also, since the down output of the position counter 14 is fed to the comparator 13, neither of the outputs 15 and 16 of the comparator 13 is produced when the present position A coincides with the set position B through the down counting in the position counter 14. Then, the discriminating circuit 17 receives neither of the outputs 15 and 16 and stops supplying the down pulses 18 to the position counter 14, whereby the control of the pulse motor 9 is stopped at the time of the coincidence of the present position A and the set position B.

On the other hand, if the comparator 13 determines that the present position A is smaller than the set position B and produces the output 16, the discriminating circuit 17 supplies the frequency divided pulses of the frequency dividing counter 11 as the up pulses 19 to the position counter 14. The up output of the position counter 14 is converted to the drive pulses $\phi 1$ to $\phi 4$ by the pulse motor exciting phase converting circuit 20 to rotate the pulse motor 9 in the direction such that the variable restrictor 8 of the digital valve 10 is opened. The present position A, i.e., the up output of the position counter 14 is compared with the set position B by the comparator 13. When neither of the outputs 15 and 16 of the comparator 13 is produced at A=B, the discriminating circuit 17 stops supplying the up pulses 19 to the position counter 14, whereby the variable restrictor 8 of the digital valve 10 is regulated to the set opening.

What is claimed is:

1. A digital valve control apparatus for regulating opening of a digital valve with a pulse motor, comprising:

a signal generating means for generating instruction signals to control said digital valve;

at least one position setter for setting the absolute position of said pulse motor;

a least one speed setter for setting the displacement speed of said pulse motor;

a selecting means for selecting a set position signal or signals from said at least position setter and a set speed signal or signals from said at least one speed setter in response to the instruction signals from said signal generating means;

a frequency divider for producing pulses having a period corresponding to the set speed by changing the ratio of frequency division in response to the set speed signal selected by said selecting means;

a comparator for determining the difference between a present position of said pulse motor and the set position selected by said selecting means;

a counter for counting up or counting down synchronously with the frequency divided pulses from said frequency divider until said comparator produces a coincidence output; and a drive means for driving said pulse motor in response to an output of said counter.

2. A digital valve control apparatus according to claim 1, wherein said counter includes a discriminating means for determining the counting up or the counting down of said counter in response to said output of said comparator.

3. A digital valve control apparatus according to claim 1, wherein said selecting means includes a priority encoder which selects only the instruction signal having a priority which is higher than that of the other instructions signals when more than two instruction signals from said signal generating means are inputted to said encoder at the same time.

* * * * *